(Model.)

J. M. DE WITT.
CAR BRAKE.

No. 274,738. Patented Mar. 27, 1883.

WITNESSES:

INVENTOR:
J. M. De Witt
BY
ATTORNEYS.

UNITED STATES PATENT OFFICE.

JAMES M. DE WITT, OF GREELEY, COLO., ASSIGNOR TO HIMSELF, JAMES W. McCREERY, AND SAMUEL F. McCREERY, ALL OF SAME PLACE.

CAR-BRAKE.

SPECIFICATION forming part of Letters Patent No. 274,738, dated March 27, 1883.

Application filed December 30, 1882. (Model.)

*To all whom it may concern:*

Be it known that I, JAMES M. DE WITT, of Greeley, in the county of Weld and State of Colorado, have invented a new and useful Improvement in Brakes, of which the following is a full, clear, and exact description.

My invention relates to the ordinary hand-wheel brake used on railway and street cars; and it consists of a spring and lever attachment for holding the pawl in contact with and disengaging it from the ratchet-wheel.

Reference is to be had to the accompanying drawings, forming part of this specification, in which similar letters of reference indicate corresponding parts in all the figures.

Figure 1:
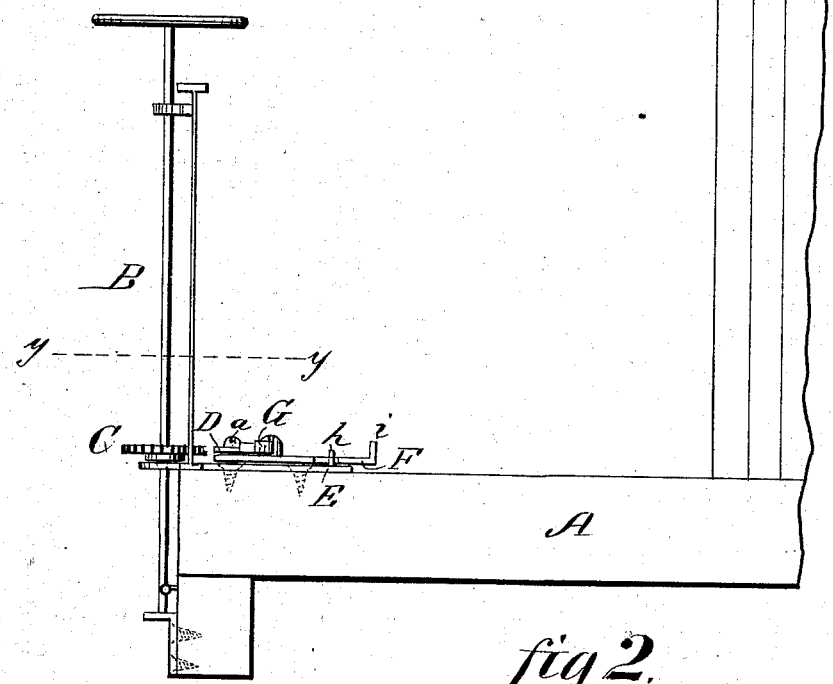
Figure 2:
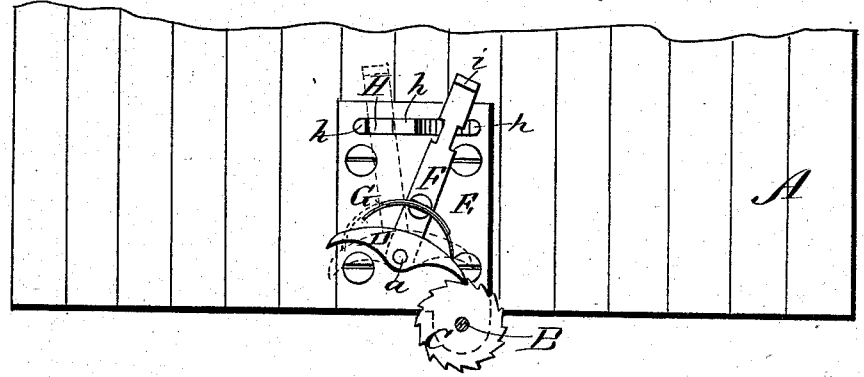
Figure 3:
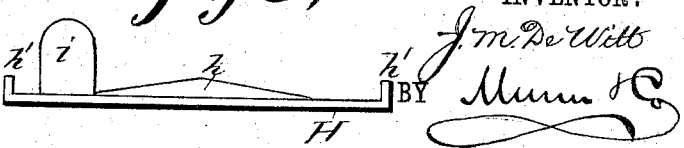

Figure 1 is a side elevation of the platform of a car having a hand-wheel brake and having my invention applied thereto. Fig. 2 is a sectional plan view of the same, taken on the line $y\ y$ of Fig. 1; and Fig. 3 is a rear edge view of the plate to which the lever is pivoted.

A represents the car-platform; B, the vertical brake-shaft; C, the ratchet-wheel secured thereto, and D the pawl that is adapted to engage with the teeth of the ratchet-wheel to hold the brakes applied. The pawl is pivoted on the stud or pin $a$, secured to or formed upon the plate E, that is screwed to the car-platform. Upon this same stud or pin $a$, under the pawl, is pivoted the forward end of the lever F. Secured to this lever, back of the pawl, is the semi-elliptic or like acting spring G, the ends of which are adapted to impinge, one at a time, against the back of the pawl, according to the position of the rear end of the lever. The rear end of the lever F rests upon the plate H, secured to or formed upon the plate E, which plate H is formed with the swell $h$ in the center of its length, for holding the rear end of the lever F in its different positions; and this plate is formed with the stops $h'\ h'$ to prevent the lever F being moved too far in either direction, and the rear end of the lever is formed with the toe-piece $i$, by means of which the brakeman may conveniently shift the lever to its different positions with his foot.

In use, when the brake is to be put on, the brakeman swings the lever F with his foot to the position shown in full lines in Fig. 2, which brings one end of the spring G in contact with the pawl D and holds it in contact with the ratchet-wheel C, as shown. Immediately after putting on the brake the lever F may be pushed back over the swell $h$ to the position shown in dotted lines in Fig. 2, which will bring the other end of the spring G against the other end of the pawl, ready to disengage the pawl from the ratchet when the shaft B shall be turned for letting off the brake; or the lever F may be left in the position shown in full lines until just before the brake is to be let off and then shifted. In this manner it will be seen that the brakeman has to give no attention to the pawl at the time of turning the shaft for putting on or letting off the brake, but is given entire freedom of body while turning the shaft. The lever F springs sufficiently to easily pass the top of swell $h$, the form of which prevents swinging of the lever to either side, except at the will of the operator, as will be readily understood.

Having thus described my invention, what I claim as new, and desire to secure by Letters Patent, is—

1. The combination, with the shaft B, ratchet-wheel C, and pawl D, of the lever F and a suitable spring, the lever being adapted to be shifted for controlling the pawl, as and for the purposes set forth.

2. The pivoted lever F, adapted to be held in different positions by the plate H, in combination with the semi-elliptical spring G and pawl D, the spring being adapted to impinge upon opposite ends of the pawl as the lever is shifted, as and for the purposes set forth.

JAMES M. DE WITT.

Witnesses:
JAMES W. McCREERY,
J. E. McCREERY.